United States Patent
King et al.

(10) Patent No.: US 11,155,330 B2
(45) Date of Patent: Oct. 26, 2021

(54) FOLDABLE WING EXTENSIONS FOR AIRCRAFT

(71) Applicant: Textron Innovations Inc., Providence, RI (US)

(72) Inventors: James Elbert King, N. Richland Hills, TX (US); Michael Edwin Rinehart, Euless, TX (US); William S. Atkins, Famers Branch, TX (US)

(73) Assignee: Textron Innovations Inc., Providence, RI (US)

( * ) Notice: Subject to any disclaimer, the term of this patent is extended or adjusted under 35 U.S.C. 154(b) by 854 days.

(21) Appl. No.: 15/963,283

(22) Filed: Apr. 26, 2018

(65) Prior Publication Data
US 2019/0329863 A1    Oct. 31, 2019

(51) Int. Cl.
*B64C 3/56* (2006.01)
*B64C 3/18* (2006.01)
*B64C 29/00* (2006.01)
*B64D 27/26* (2006.01)
*B64C 3/54* (2006.01)

(52) U.S. Cl.
CPC ............... *B64C 3/56* (2013.01); *B64C 3/185* (2013.01); *B64C 3/546* (2013.01); *B64C 29/0033* (2013.01); *B64D 27/26* (2013.01); *B64D 2027/262* (2013.01)

(58) Field of Classification Search
CPC ......... B64C 3/546; B64C 3/56; B64C 23/069; B64C 23/072; B64C 29/0033
See application file for complete search history.

(56) References Cited

U.S. PATENT DOCUMENTS

| | | |
|---|---|---|
| 2,623,713 A | 12/1952 | Bruce |
| 2007/0152098 A1* | 7/2007 | Sheahan, Jr. ............. B64C 3/56 244/49 |
| 2017/0008625 A1 | 1/2017 | Dim et al. |
| 2017/0174314 A1* | 6/2017 | Diamante ................. B64C 3/56 |
| 2018/0057148 A1 | 3/2018 | Bosworth |
| 2018/0057159 A1 | 3/2018 | Ivans et al. |
| 2018/0079487 A1* | 3/2018 | Ivans ................... B64C 29/0033 |
| 2018/0079493 A1 | 3/2018 | Anderson et al. |

OTHER PUBLICATIONS

European Exam Report; Application No. EP 18204447.9; European Patent Office; dated Jun. 4, 2019.
European Search Report; Application No. EP 18204447.9; European Patent Office; dated May 20, 2019.

* cited by examiner

*Primary Examiner* — Nicholas McFall
(74) *Attorney, Agent, or Firm* — Lawrence Youst PLLC (57) ABSTRACT

A propulsion and lift system for an aircraft includes a wing having an outboard end and a pylon assembly coupled to the outboard end of the wing. The propulsion and lift system also includes a wing extension rotatably coupled to the outboard end of the pylon assembly. The wing extension is rotatable between a flight position in a flight mode and a stow position in a storage mode. The wing extension folds inboard in the stow position, thereby reducing a wingspan of the aircraft in the storage mode.

19 Claims, 6 Drawing Sheets

FOLDABLE WING EXTENSIONS FOR AIRCRAFT

TECHNICAL FIELD OF THE DISCLOSURE

The present disclosure relates, in general, to wing extensions operable for use on aircraft and, in particular, to aircraft wing extensions that are operable to transition between a flight position and a stow position in which the wing extensions are folded to reduce the wingspan and the storage footprint of the aircraft.

BACKGROUND

Several types of aircraft incorporate pylons into their primary wing structure. For example, an airplane wing may incorporate a fixed pylon that includes a jet engine or propeller. In tiltrotor aircraft, pylons are typically mounted at or near the outboard ends of the wing. Each pylon, which includes a proprotor, is rotatable relative to the wing such that the proprotor blades have a generally horizontal plane of rotation providing vertical lift for takeoff, hovering and landing, much like a conventional helicopter, and a generally vertical plane of rotation providing forward thrust for cruising in forward flight with the wing providing lift, much like a conventional propeller driven airplane. In addition, tiltrotor aircraft can be operated in configurations between the helicopter flight mode and the airplane flight mode, which may be referred to as conversion flight mode. A drive system, including an engine or motor, provides rotational energy to the proprotors, and may be located in the fuselage, pylons and/or wing of the tiltrotor aircraft.

Pylons mounted on the outboard ends of a wing can limit the wingspan of the aircraft. Wing extensions may be mounted outboard of the pylons to increase the wingspan and aspect ratio of the aircraft. Wing extensions increase the efficiency of aircraft in flight, including the capability to fly at a higher altitude for longer ranges with the same fuel load. While wing extensions can be highly effective during flight, they have the drawback of increasing the storage footprint of the aircraft when the aircraft is not in use. This increased storage footprint reduces the number of aircraft that can be stored in aircraft carriers, hangers and other spatially limited storage facilities. Accordingly, a need has arisen for wing extensions that reap the benefits of an increased wingspan during flight, yet have a limited impact on the aircraft's storage footprint when the aircraft is not in use.

SUMMARY

In a first aspect, the present disclosure is directed to a propulsion and lift system for an aircraft including a wing having an outboard end and a pylon assembly coupled to the outboard end of the wing. The propulsion and lift system also includes a wing extension rotatably coupled to the outboard end of the pylon assembly. The wing extension is rotatable between a flight position in a flight mode and a stow position in a storage mode. The wing extension folds inboard in the stow position, thereby reducing a wingspan of the aircraft in the storage mode.

In some embodiments, the wing extension may extend outboard in the flight position to increase the wingspan of the aircraft in the flight mode. In certain embodiments, the wing extension may fold over the pylon assembly in the stow position. In some embodiments, the propulsion and lift system may include a hinge assembly including a revolute joint, the wing extension rotatably coupled to the pylon assembly about the hinge assembly. In certain embodiments, the wing extension may include a spar having a proximal end forming a spar hinge fitting and the revolute joint may include the spar hinge fitting. In some embodiments, the pylon assembly may include a pylon hinge fitting and the revolute joint may include the pylon hinge fitting. In certain embodiments, the spar hinge fitting may include a leg forming an angle with the spar of less than 180 degrees. In some embodiments, the revolute joint may include the proximal end of the spar hinge fitting and the distal end of the spar hinge fitting may include a spar lock fitting lockable to the pylon assembly to secure the wing extension in the flight position.

In certain embodiments, the pylon assembly may include a pylon lock fitting and the pylon lock fitting and the spar lock fitting may form a wing extension lock assembly operable to lock the wing extension into the flight position. In some embodiments, the pylon lock fitting may include one of a clevis or a lug and the spar lock fitting may include the other of the clevis or the lug. In such embodiments, the wing extension lock assembly may include a pin selectively insertable through the clevis and the lug to lock the wing extension into the flight position. In certain embodiments, the wing extension lock assembly may include a pin actuator including a pin and the pin actuator may be adapted to move the pin between a locked position and an unlocked position. In such embodiments, the pin may be extended through the pylon lock fitting and the spar lock fitting in the locked position and at least partially retracted from the pylon lock fitting and the spar lock fitting in the unlocked position to permit rotation of the wing extension about the hinge assembly.

In some embodiments, the hinge assembly may include a rotary actuator operable to rotate the wing extension between the flight position and the stow position. In certain embodiments, the rotary actuator may be an electrical rotary actuator or a hydraulic rotary actuator. In some embodiments, the rotary actuator may be a lockable rotary actuator operable to selectively lock the wing extension in the stow position. In certain embodiments, the hinge assembly may include a shaft coupling the rotary actuator to the revolute joint. In such embodiments, the rotary actuator may be operable to rotate the shaft to provide rotational energy to the revolute joint, thereby rotating the wing extension. In some embodiments, the revolute joint may include a forward revolute joint and an aft revolute joint and the wing extension may include a forward spar and an aft spar. In such embodiments, the forward spar may be rotatably coupled to the pylon assembly about the forward revolute joint, the aft spar may be rotatably coupled to the pylon assembly about the aft revolute joint, the rotary actuator may include a gearbox interposed between the forward and aft revolute joints and the shaft may include one or more shafts coupling the gearbox to the forward and aft revolute joints. Also in such embodiments, the rotary actuator may be operable to rotate the one or more shafts via the gearbox to provide rotational energy to the forward and aft revolute joints, thereby rotating the wing extension. In certain embodiments, the one or more shafts may form a common shaft interconnecting the forward revolute joint, the gearbox and the aft revolute joint.

In some embodiments, the hinge assembly may form a hinge line offset from the wing extension. In certain embodiments, the hinge line may be vertically offset from the wing extension. In some embodiments, the propulsion and lift system may include a wing extension lock assembly operable to selectively lock the wing extension into the flight position. In certain embodiments, the wing extension lock assembly may lock the wing extension into the flight position in response to the wing extension moving into the flight position. In some embodiments, the wing extension lock assembly may include a pin actuator movable between a locked position and an unlocked position and the pin actuator may be operable to pin the wing extension against the pylon assembly in the locked position to secure the wing extension in the flight position. In certain embodiments, the wing extension may include a plurality of spars including a forward spar, and the pin actuator may be operable to pin the forward spar against the pylon assembly in the locked position to secure the wing extension in the flight position.

In a second aspect, the present disclosure is directed to a tiltrotor aircraft including a fuselage, a wing supported by the fuselage and first and second pylon assemblies each rotatably coupled to a respective one of the first and second outboard ends of the wing. The tiltrotor aircraft also includes first and second wing extensions each rotatably coupled to the outboard end of a respective one of the first and second pylon assemblies. The wing extensions are rotatable between a flight position in a flight mode and a stow position in a storage mode. The wing extensions fold inboard toward the fuselage in the stow position, thereby reducing a wingspan of the tiltrotor aircraft in the storage mode.

In some embodiments, the pylon assemblies may each include a proprotor assembly. In certain embodiments, the wing extensions may extend outboard away from the fuselage in the flight position to increase the wingspan of the tiltrotor aircraft in the flight mode. In some embodiments, the wing extensions may be substantially parallel with the wing when the wing extensions are in the stow position. In certain embodiments, the wing and the wing extensions may form a plane when the wing extensions are in the flight position. In some embodiments, the wing extensions may each have an angular range of motion of greater than 150 degrees between the flight position and the stow position.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
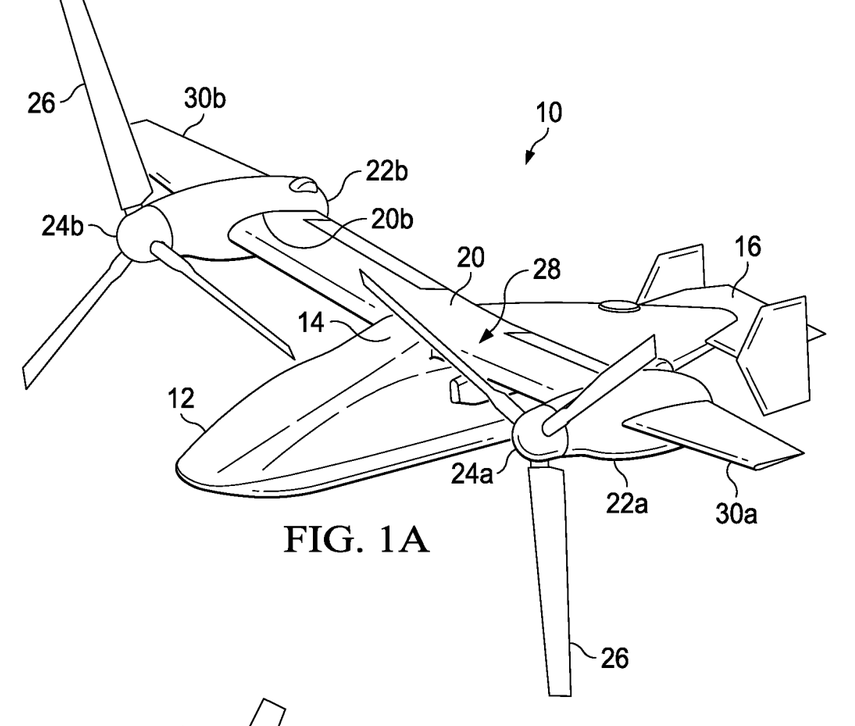
FIGS. 1A-1B are schematic illustrations of a tiltrotor aircraft having foldable wing extensions in accordance with embodiments of the present disclosure.
Figure 1B:
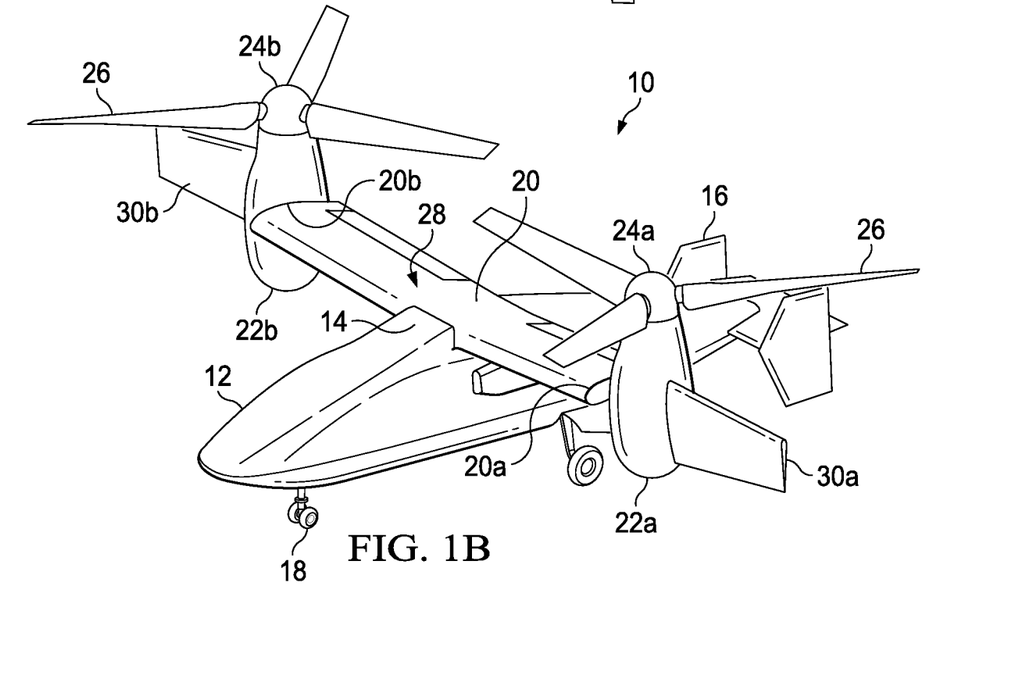

Referring to FIGS. 1A-1B in the drawings, a tiltrotor aircraft is schematically illustrated and generally designated 10. Tiltrotor aircraft 10 includes a fuselage 12, a wing mount assembly 14 and a tail assembly 16. Tail assembly 16 may have control surfaces operable for horizontal and/or vertical stabilization during flight. A landing gear system 18 provides ground support for tiltrotor aircraft 10. A wing 20 is supported by fuselage 12 and wing mount assembly 14.

Coupled to outboard ends 20a, 20b of wing 20 are pylon assemblies 22a, 22b. Pylon assembly 22a is rotatable relative to wing 20 between a generally horizontal orientation, as best seen in FIG. 1A, and a generally vertical orientation, as best seen in FIG. 1B. Pylon assembly 22a includes a rotatable portion of the drive system and a proprotor assembly 24a that is rotatable responsive to torque and rotational energy provided by an engine or motor of the drive system. Likewise, pylon assembly 22b is rotatable relative to wing 20 between a generally horizontal orientation, as best seen in FIG. 1A, and a generally vertical orientation, as best seen in FIG. 1B. Pylon assembly 22b includes a rotatable portion of the drive system and a proprotor assembly 24b that is rotatable responsive to torque and rotational energy provided by an engine or motor of the drive system. In the illustrated embodiment, proprotor assemblies 24a, 24b each include three proprotor blade assemblies 26. It should be understood by those having ordinary skill in the art, however, that proprotor assemblies 24a, 24b could alternatively have a different number of proprotor blade assemblies, either less than or greater than three. In addition, it should be understood that the position of pylon assemblies 22a, 22b, the angular velocity or revolutions per minute (RPM) of proprotor assemblies 24a, 24b, the pitch of proprotor blade assemblies 26 and the like may be controlled by the pilot of tiltrotor aircraft 10 and/or a flight control system to selectively control the direction, thrust and lift of tiltrotor aircraft 10 during flight.

FIG. 1A illustrates tiltrotor aircraft 10 in a forward flight mode or airplane flight mode, in which proprotor assemblies 24a, 24b are positioned to rotate in a substantially vertical plane and provide a forward thrust while a lifting force is supplied by wing 20 such that tiltrotor aircraft 10 flies much like a conventional propeller driven aircraft. FIG. 1B illustrates tiltrotor aircraft 10 in a vertical takeoff and landing (VTOL) flight mode or helicopter flight mode, in which proprotor assemblies 24a, 24b are positioned to rotate in a substantially horizontal plane and provide a vertical thrust such that tiltrotor aircraft 10 flies much like a conventional helicopter. During operation, tiltrotor aircraft 10 may convert from helicopter flight mode to airplane flight mode following vertical takeoff and/or hover. Likewise, tiltrotor aircraft 10 may convert back to helicopter flight mode from airplane flight mode for hover and/or vertical landing. In addition, tiltrotor aircraft 10 can perform certain flight maneuvers with proprotor assemblies 24a, 24b positioned between airplane flight mode and helicopter flight mode, which can be referred to as conversion flight mode.

Wing 20 and pylon assemblies 22a, 22b form part of a propulsion and lift system 28 for tiltrotor aircraft 10. Fuselage 12 may include a drive system, including an engine, motor and/or transmission, for providing torque and rotational energy to each proprotor assembly 24a, 24b via one or more drive shafts located in wing 20. In other embodiments, each pylon assembly 22a, 22b houses a drive system, such as an engine, motor and/or transmission, for supplying torque and rotational energy to a respective proprotor assembly 24a, 24b. In such embodiments, the drive systems of each pylon assembly 22a, 22b may be coupled together via one or more drive shafts located in wing 20 such that either drive system can serve as a backup to the other drive system in the event of a failure. In tiltrotor aircraft having both pylon and fuselage mounted drive systems, the fuselage mounted drive system may serve as a backup drive system in the event of failure of either or both of the pylon mounted drive systems.

Figure 2A:
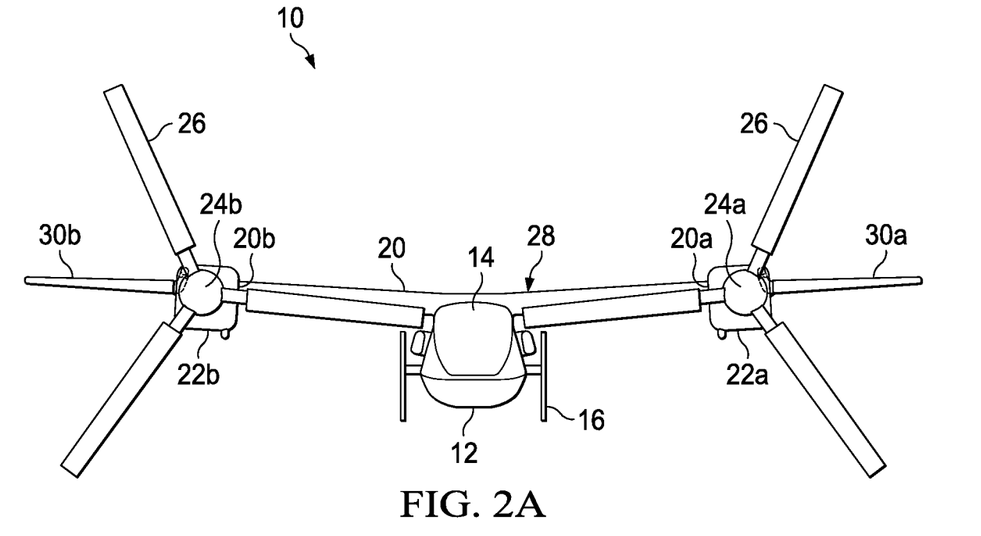
FIGS. 2A-2B are schematic illustrations of a tiltrotor aircraft in a flight mode and a storage mode in accordance with embodiments of the present disclosure.
Figure 2B:
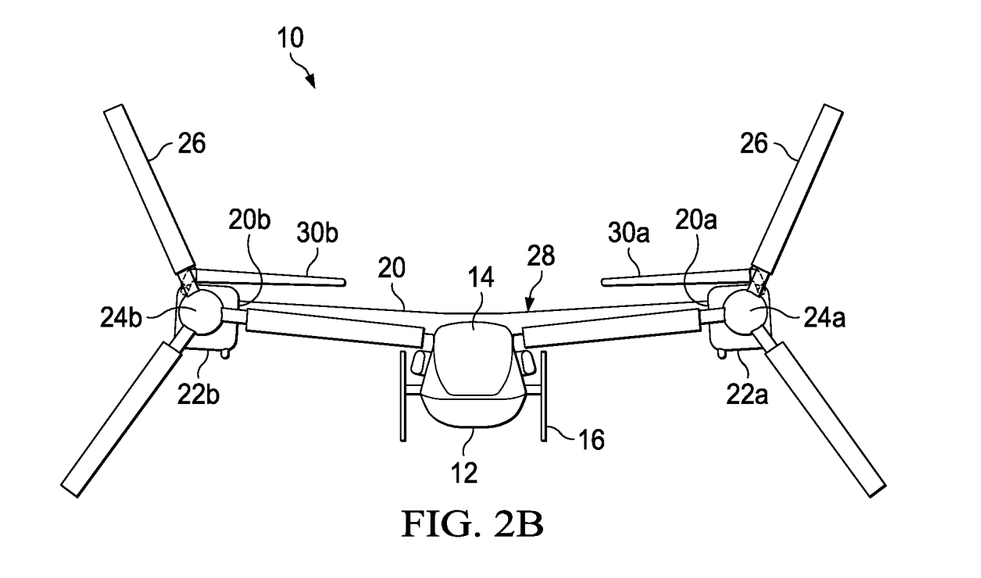
Figure 3A:
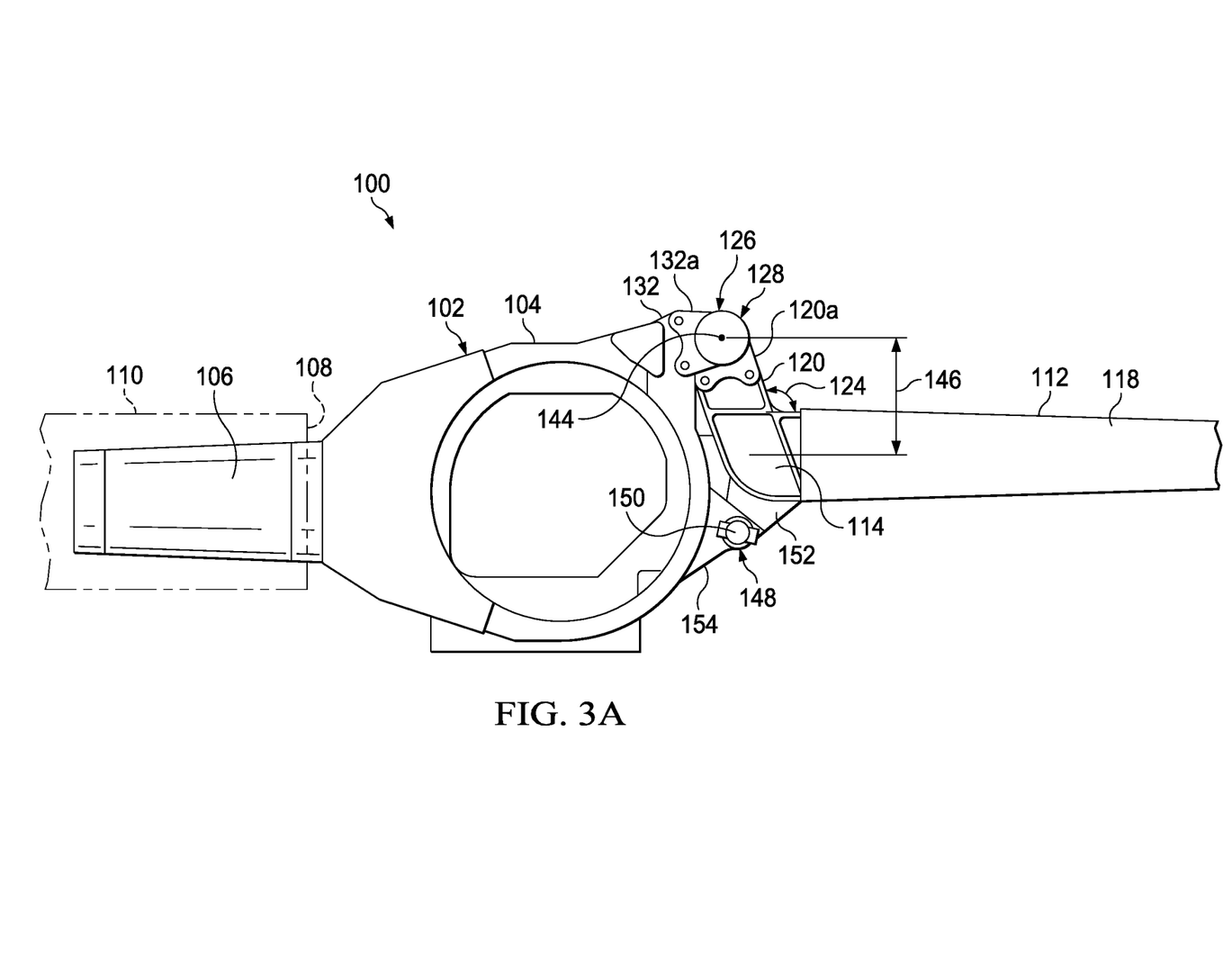
FIGS. 3A-3E are various views of a foldable wing extension in a flight position in accordance with embodiments of the present disclosure.
Figure 3B:
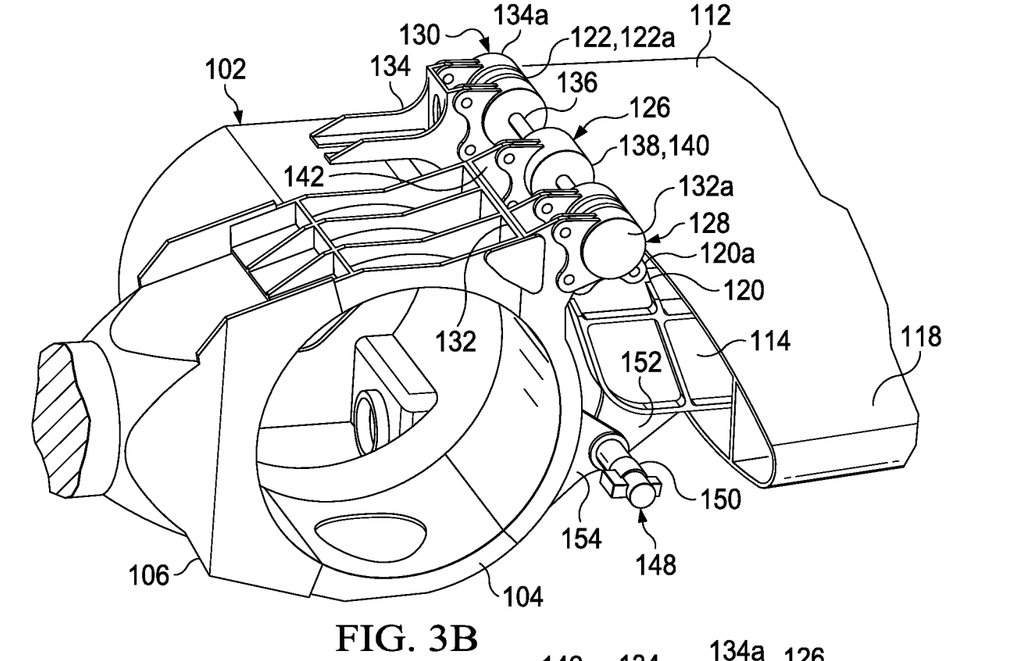
Figure 3C:
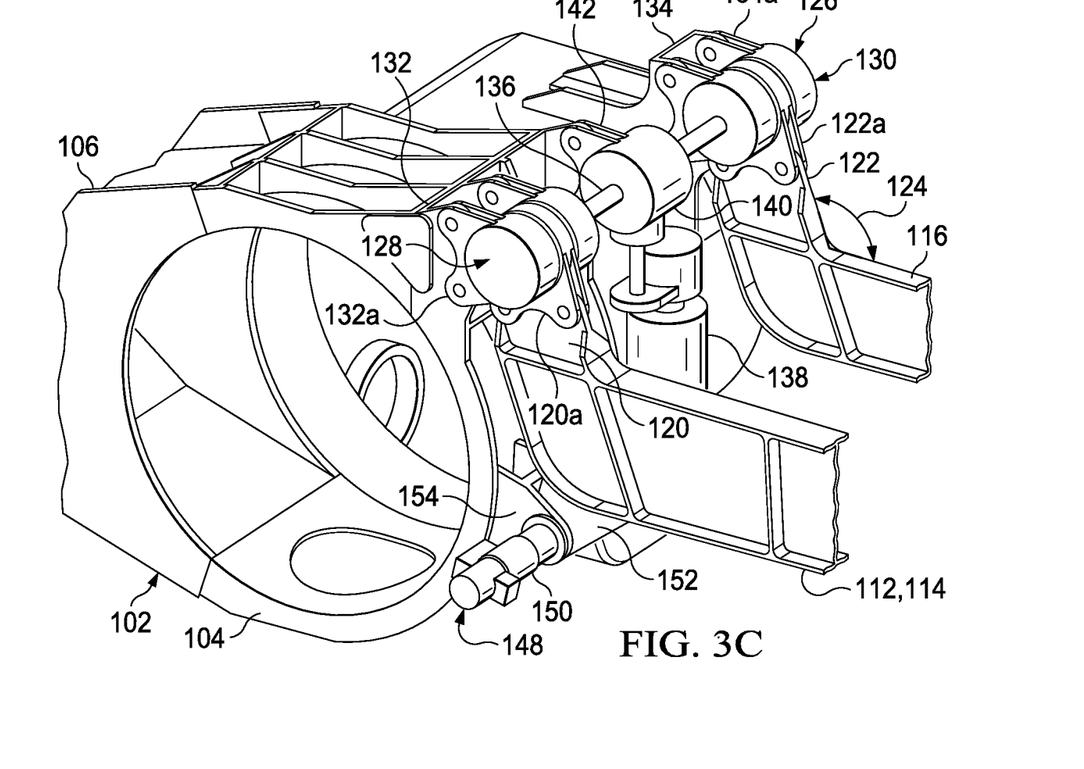
Figure 3D:
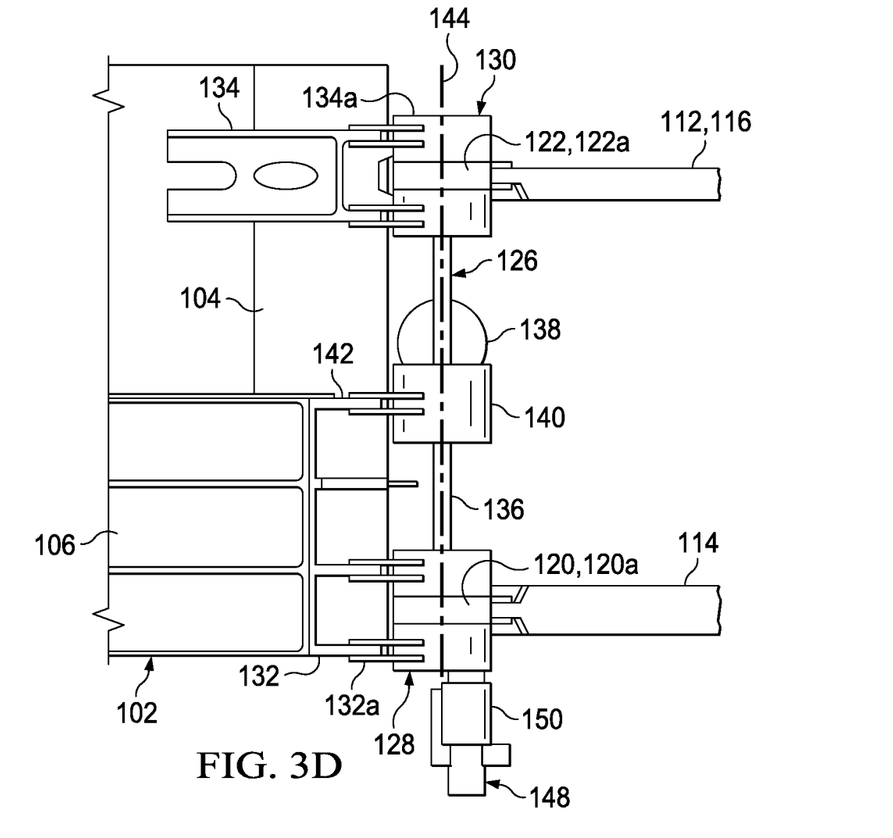
Figure 3E:
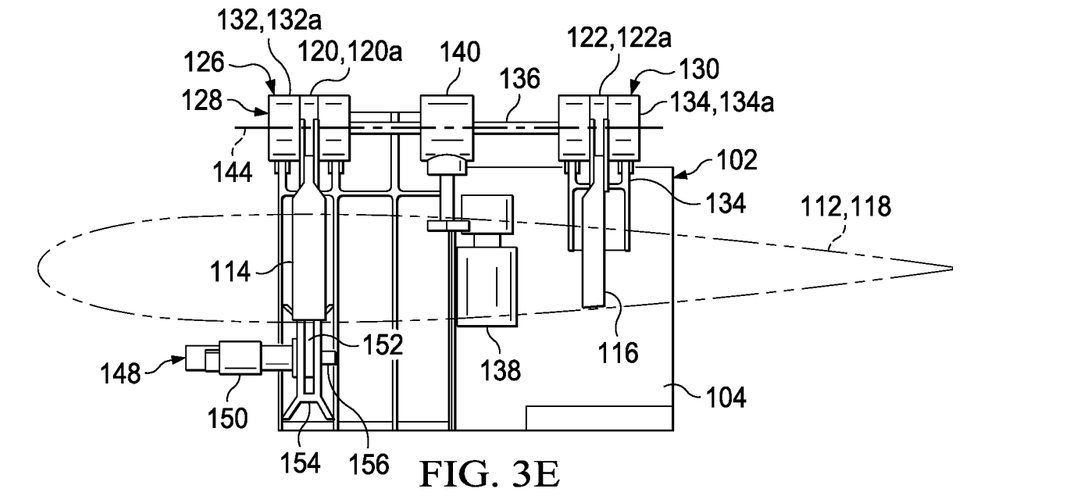

Referring to FIGS. 2A-2B in the drawings, tiltrotor aircraft 10 includes wing extensions 30a, 30b rotatably coupled to the outboard ends of pylon assemblies 22a, 22b, respectively. Wing extensions 30a, 30b may be any length relative to wing 20. In one example, the length of each wing extension 30a, 30b may be between 20 to 45 percent of the length of wing 20. In a more specific non-limiting example, the length of each wing extension 30a, 30b may be between 35 to 40 percent of the length of wing 20. FIG. 2A shows tiltrotor aircraft 10 in flight mode, in which wing extensions 30a, 30b are in a flight position. FIG. 2B shows tiltrotor aircraft 10 in storage mode, in which wing extensions 30a, 30b are folded into a stow position. In the flight mode shown in FIG. 2A, wing extensions 30a, 30b are extended outboard, away from fuselage 12, to increase the wingspan of tiltrotor aircraft 10 during flight. When wing extensions 30a, 30b are in the flight position, wing 20 and wing extensions 30a, 30b form a plane that provides lift for tiltrotor aircraft 10. In particular, wing 20 and wing extensions 30a, 30b form a substantially horizontal plane, which encompasses anhedral or dihedral wing or wing extension configurations. Wing extensions 30a, 30b provide an increased wingspan for tiltrotor aircraft 10 in flight mode, thereby increasing the efficiency of tiltrotor aircraft 10 in flight.

In the storage mode of tiltrotor aircraft 10 shown in FIG. 2B, wing extensions 30a, 30b are in the stow position. In particular, wing extensions 30a, 30b are rotated, or folded, inboard toward fuselage 12, thereby reducing the wingspan of tiltrotor aircraft 10. In the illustrated embodiment, wing extensions 30a, 30b each have an angular range of motion of approximately 180 degrees between the flight position shown in FIG. 2A and the stow position shown in FIG. 2B. Wing extensions 30a, 30b, however, may have any angular range of motion between the flight and stow positions, including angular ranges of motion approximately equal to or greater than 45, 60, 90, 120, 150 or 180 degrees. Wing extensions 30a, 30b fold over the top of pylon assemblies 22a, 22b and portions of wing 20 in the stow position. In other embodiments, wing extensions 30a, 30b may fold over only pylon assemblies 22a, 22b in the stow position. In yet other embodiments, wing extensions 30a, 30b may fold underneath pylon assemblies 22a, 22b, or in the forward or aft direction. As shown in FIG. 2B, wing extensions 30a, 30b are substantially parallel with wing 20 when wing extensions 30a, 30b are in the stow position, although in other embodiments wing extensions 30a, 30b may be non-parallel with wing 20 while in the stow position. Folding wing extensions 30a, 30b inboard in the storage mode lowers the storage footprint of tiltrotor aircraft 10, thereby conserving the amount of storage space required by tiltrotor aircraft 10 in spatially limited facilities, such as aircraft carriers and hangers. While wing extensions 30a, 30b are shown to be in the stow position while tiltrotor aircraft 10 is in forward flight mode, it will be appreciated by one of ordinary skill in the art that wing extensions 30a, 30b may also be in the stow position while tiltrotor aircraft 10 is in the VTOL flight mode shown in FIG. 1B. In other embodiments, foldable wing extensions 30a, 30b may be mounted onto fixed, or non-rotatable, pylons of tiltrotor aircraft.

It should be appreciated that tiltrotor rotorcraft 10 is merely illustrative of a variety of aircraft that can implement the embodiments disclosed herein. Indeed, foldable wing extensions 30a, 30b may be utilized on any winged aircraft. Other aircraft implementations can include hybrid aircraft, compound aircraft, tiltwing aircraft, quad tiltrotor aircraft, helicopters, jets, propeller airplanes and the like. As such, those skilled in the art will recognize that any number of foldable wing extensions 30a, 30b disclosed herein can be integrated into a variety of aircraft configurations. It should be appreciated that even though aircraft are particularly well-suited to implement the embodiments of the present disclosure, non-aircraft vehicles and devices can also implement the embodiments.

Referring to FIGS. 3A-3E in the drawings, a propulsion and lift system for a tiltrotor aircraft is schematically illustrated and generally designated 100. Propulsion and lift system 100 includes pylon assembly 102. Pylon assembly 102 includes a pylon support 104 and a spindle 106. Spindle 106 is insertable into outboard end 108 of wing 110 such that pylon assembly 102 is rotatable relative to wing 110, as described in FIGS. 1A-1B. For ease of reference, pylon assembly 102 is illustrated without a proprotor. Wing extension 112 is rotatably coupled to the outboard end of pylon support 104. A pylon assembly and wing extension substantially similar to pylon assembly 102 and wing extension 112 may be rotatably coupled to the opposite end of wing 110. For the sake of efficiency, certain features will be disclosed only with respect to pylon assembly 102 and wing extension 112. One having ordinary skill in the art, however, will fully appreciate an understanding of the other pylon assemblies and wing extensions on the tiltrotor aircraft based on the disclosure herein of pylon assembly 102 and wing extension 112.

Wing extension 112 includes a forward spar 114 and an aft spar 116. In other embodiments, wing extension 112 may include any number of spars or support structures, including a single spar. Wing extension 112 also includes a skin 118 substantially covering forward and aft spars 114, 116. The proximal ends of forward and aft spars 114, 116 each form a spar hinge fitting 120, 122 including a lug extension 120a, 122a, respectively. Spar hinge fittings 120, 122 each form a leg. Each leg forms an angle 124 with the outboard portion of a respective one of forward and aft spars 114, 116. Spar hinge fittings 120, 122 are illustrated as forming an obtuse angle 124 with forward and aft spars 114, 116, respectively. In other embodiments, angle 124 may be an acute angle or any angle less than 180 degrees.

Wing extension 112 is rotatably coupled to the outboard end of pylon support 104 about a hinge assembly 126. Hinge assembly 126 includes a forward revolute joint 128 and an aft revolute joint 130. Hinge assembly 126, however, may include any number of revolute joints, such as a single revolute joint or three or more revolute joints. Hinge assembly 126 may also be formed from other joint types, such as a ball and socket joint, pivot joint, saddle joint or universal joint, as well as others. Forward spar 114 is rotatably coupled to pylon support 104 about forward revolute joint 128 and aft spar 116 is rotatably coupled to pylon support 104 about aft revolute joint 130.

Forward revolute joint 128 includes the proximal end of spar hinge fitting 120 and a pylon hinge fitting 132 protruding from a forward portion of pylon support 104. In particular, pylon hinge fitting 132 includes a clevis extension 132a, which, along with lug extension 120a of spar hinge fitting 120, form forward revolute joint 128. Similarly, aft revolute joint 130 includes the proximal end of spar hinge fitting 122 and a pylon hinge fitting 134 protruding from an aft portion of pylon support 104. In particular, pylon hinge fitting 134 includes a clevis extension 134a, which, along with lug extension 122a of spar hinge fitting 122, form aft revolute joint 130. While forward and aft revolute joints 128, 130 are illustrated as having a clevis and lug configuration, it will be appreciated by one of ordinary skill in the art that revolute joints 128, 130 may have numerous different structural configurations. For example, the proximal ends of spar hinge fittings 120, 122 may instead form clevis extensions and pylon hinge fittings 132, 134 may instead include lug extensions. While lug extensions 120a, 122a are illustrated as separate components from the remainder of spar hinge fittings 120, 122, in other embodiments lug extensions 120a, 122a may be structurally integral with spar hinge fittings 120, 122, respectively. Similarly, while clevis extensions 132a, 134a are illustrated as separate components from the remainder of pylon hinge fittings 132, 134, in other embodiments clevis extensions 132a, 134a may be structurally integral with pylon hinge fittings 132, 134, respectively.

In the illustrated embodiment, hinge assembly 126 includes a common shaft 136 interconnecting forward revolute joint 128 and aft revolute joint 130. Interposed between forward revolute joint 128 and aft revolute joint 130 is rotary actuator 138, which includes a gearbox 140. Rotary actuator 138 is operable to rotate wing extension 112 between the flight position and the stow position. Rotary actuator 138 is coupled to shaft 136 via gearbox 140. Thus, shaft 136 couples gearbox 140 to forward and aft revolute joints 128, 130. Rotary actuator 138 rotates shaft 136 via gearbox 140 to provide rotational energy to forward and aft revolute joints 128, 130, thereby rotating wing extension 112. Rotary actuator 138 may be an electrical rotary actuator, a hydraulic rotary actuator, a multiple linear actuator joint system or any other type of actuator. Rotary actuator 138 may be a lockable rotary actuator that is operable to selectively lock wing extension 112 into the flight position. Gearbox 140 may be mounted to pylon support 104 by a pylon gearbox fitting 142 that protrudes from an area of pylon support 104 proximate to gearbox 140. In other embodiments, common shaft 136 may instead be two or more structurally separate shafts that couple rotary actuator 138 to forward and aft revolute joints 128, 130. In further embodiments, hinge assembly 126 may include one or more linear actuators and/or multiple rotary actuators.

Hinge assembly 126 forms a hinge line 144 about which wing extension 112 rotates. Hinge assembly 126, including hinge line 144, is proximate to the top of pylon assembly 102 to provide wing extension 112 with adequate clearance to fold over pylon assembly 102 in the stow position, and to allow wing extension 112 to perform a 180 degree fold over. Wing extension 112 is offset from hinge line 144 to allow wing extension 112 to fold over the top of pylon assembly 102. In particular, wing extension 112 is vertically offset from hinge line 144 by a vertical offset distance 146. Wing extension 112 may also be horizontally offset from hinge line 144 by any distance.

Propulsion and lift system 100 includes a wing extension lock assembly 148 operable to selectively lock wing extension 112 into the flight position. Wing extension lock assembly 148 includes a pin actuator 150 movable between a locked position and an unlocked position. Pin actuator 150 pins a portion of wing extension 112, such as forward spar 114, against pylon assembly 102 in the locked position to secure wing extension 112 in the flight position. A spar lock fitting 152 is disposed proximate to the distal end of spar hinge fitting 120, or the lower inboard edge of forward spar 114. In the illustrated embodiment, spar lock fitting 152 is a lug. Wing extension lock assembly 148 also includes a pylon lock fitting 154 protruding from a forward portion of pylon support 104. Pylon lock fitting 154 forms a clevis. Pin actuator 150 includes a pin 156 that is extended through pylon lock fitting 154 and spar lock fitting 152 in the locked position, thereby locking spar lock fitting 152, and thus wing extension 112, to pylon assembly 102 to secure wing extension 112 in the flight position. In the illustrated embodiment, pin 156 extends through the clevis of pylon lock fitting 154 and the lug of spar lock fitting 152 to lock forward spar 114, and thus wing extension 112, into the flight position. In the unlocked position, pin 156 is at least partially retracted from pylon lock fitting 154 and spar lock fitting 152 to permit rotation of wing extension 112 about hinge assembly 126.

In some embodiments, wing extension lock assembly 148 may lock wing extension 112 into the flight position in response to wing extension 112 moving into the flight position. For example, pin actuator 150 may automatically extend pin 156 through pylon lock fitting 154 and spar lock fitting 152 in response to wing extension 112 rotating into the flight position. In other embodiments, pin actuator 150 may be locked or unlocked manually by a pilot or from elsewhere. Pin actuator 150 may be an electric, hydraulic or other type of actuator. While pylon lock fitting 154 is illustrated as a clevis and spar lock fitting 152 is illustrated as a lug, in other embodiments pylon lock fitting 154 may be a lug and spar lock fitting 152 may be a clevis. Structural arrangements other than a clevis and lug configuration may also be used to lock wing extension 112 against pylon assembly 102. In other embodiments, a wing extension lock assembly may be used to lock wing extension 112 against wing 110. Wing extension lock assembly 148 is illustrated as locking forward spar 114 against pylon assembly 102 because in many operational circumstances forward spar 114 is subject to more load forces than aft spar 116. However, either or both of forward spar 114 or aft spar 116 may include a wing extension lock assembly.

The illustrative embodiments advantageously lock wing extension 112 against pylon assembly 102 in at least two locations in the flight position: hinge assembly 126 and wing extension lock assembly 148. Locking wing extension 112 against pylon assembly 102 in at least two places helps to stabilize wing extension 112 while being subjected to lift, buffeting, aerodynamic and other forces during flight and opposes the moment arm induced by lift forces, thereby preventing wing extension 112 from rotating from the flight position into the stow position during flight. Including two or more fixation structures in the flight position also lowers the load at each fixation structure since the load is shared between the at least two fixation structures. The stiffness of wing extension 112 is also increased in the face of various flight loads. In the illustrative embodiments, hinge assembly 126 may be considered a structural feature in that wing extension loading is coupled out between hinge assembly 126 at an upper portion of wing extension 112 and wing extension lock assembly 148 at a lower portion of wing extension 112.

Figure 4A:
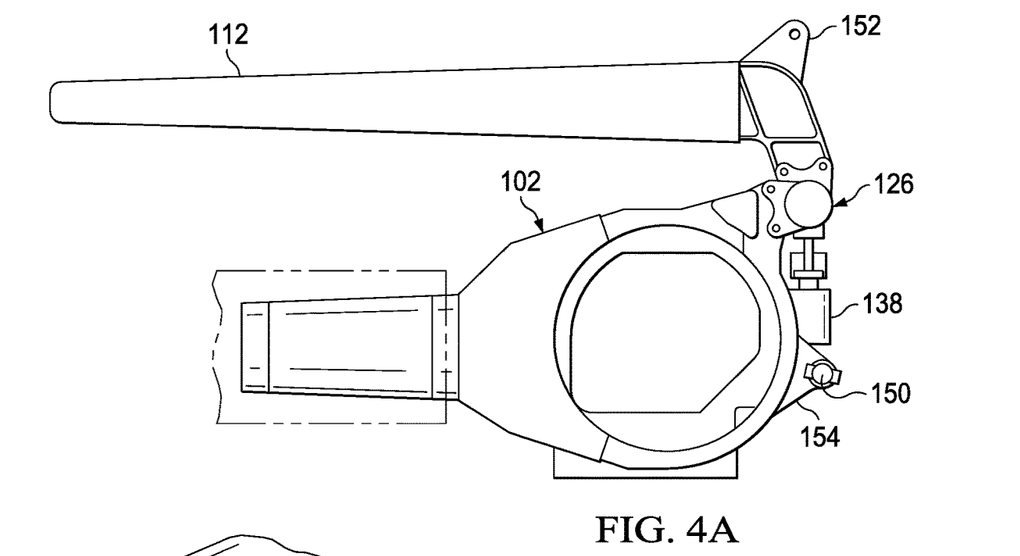
FIGS. 4A-4B are various views of a foldable wing extension in a stow position in accordance with embodiments of the present disclosure.
Figure 4B:
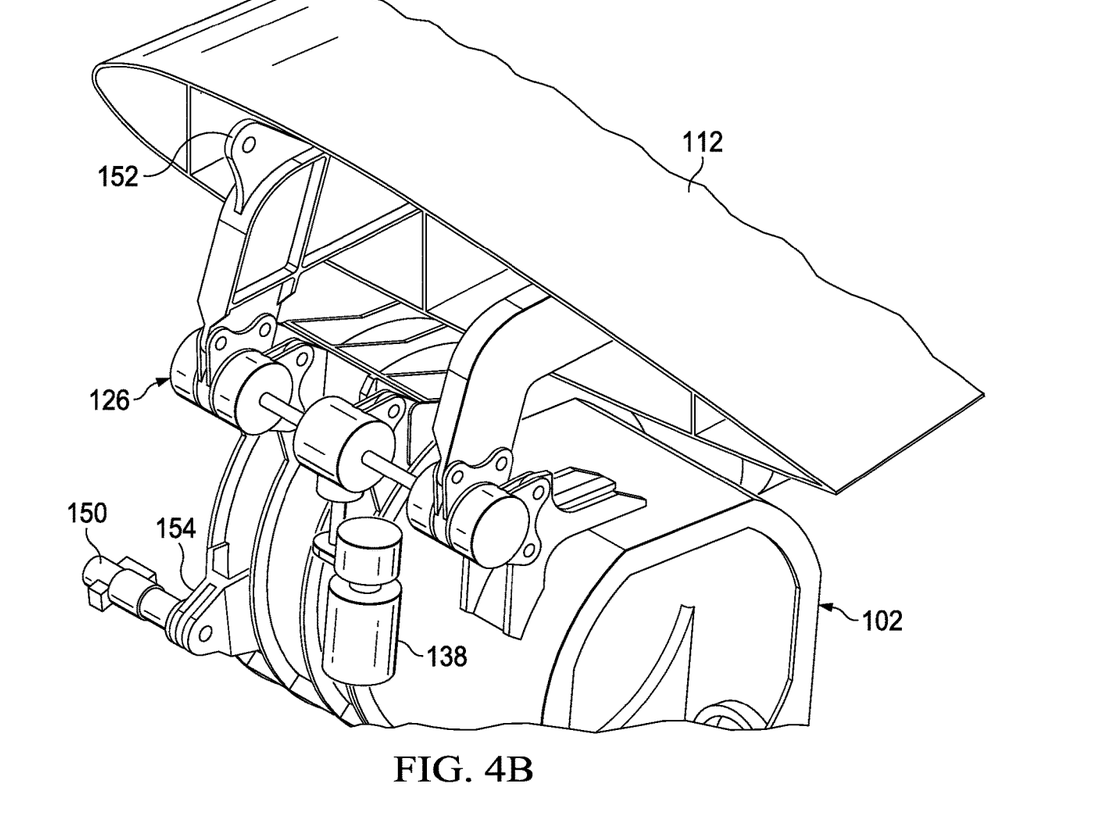

Referring to FIGS. 4A-4B in the drawings, wing extension 112 is shown in the stow position. To move wing extension 112 from the flight position, shown in FIGS. 3A-3E, to the stow position, shown in FIGS. 4A-4B, pin actuator 150 at least partially retracts the pin from pylon lock fitting 154 and spar lock fitting 152 to permit rotary actuator 138 to rotate wing extension 112 inboard about hinge assembly 126. Hinge assembly 126 is proximate to the top of pylon assembly 102 so that wing extension 112 may fold over pylon assembly 102, allowing for a foldover of approximately 180 degrees between the flight position and the stow position. In some embodiments, rotary actuator 138 may be a lockable rotary actuator that is operable to selectively lock wing extension 112 in the stow position. Rotating wing extension 112 into the stow position reduces the effective wingspan of the tiltrotor aircraft, thereby lowering its storage footprint when not in use.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A propulsion and lift system for an aircraft comprising:
a wing having an outboard end;
a pylon assembly coupled to the outboard end of the wing, the pylon assembly having an outboard end; and
a wing extension rotatably coupled to the outboard end of the pylon assembly, the wing extension rotatable between a flight position in a flight mode and a stow position in a storage mode;
wherein, the wing extension folds inboard in the stow position, thereby reducing a wingspan of the aircraft in the storage mode; and
wherein, the wing extension has an angular range of motion of at least 180 degrees such that the wing extension is parallel with the wing when the wing extension is in the stow position.

2. The propulsion and lift system as recited in claim 1 wherein the wing extension extends outboard in the flight position to increase the wingspan of the aircraft in the flight mode.

3. The propulsion and lift system as recited in claim 1 wherein the wing extension folds over the pylon assembly in the stow position.

4. The propulsion and lift system as recited in claim 1 further comprising a hinge assembly including a revolute joint, the wing extension rotatably coupled to the pylon assembly about the hinge assembly.

5. The propulsion and lift system as recited in claim 4 wherein the wing extension further comprises a spar having a proximal end forming a spar hinge fitting, the revolute joint further comprising the spar hinge fitting.

6. The propulsion and lift system as recited in claim 5 wherein the pylon assembly further comprises a pylon hinge fitting, the revolute joint further comprising the pylon hinge fitting.

7. The propulsion and lift system as recited in claim 5 wherein the spar hinge fitting further comprises a leg forming an angle with the spar of less than 180 degrees.

8. The propulsion and lift system as recited in claim 5 wherein the spar hinge fitting has a distal end including a spar lock fitting lockable to the pylon assembly to secure the wing extension in the flight position.

9. The propulsion and lift system as recited in claim 8 wherein the pylon assembly further comprises a pylon lock fitting, the pylon lock fitting and the spar lock fitting forming a wing extension lock assembly operable to lock the wing extension into the flight position.

10. The propulsion and lift system as recited in claim 9 wherein the wing extension lock assembly further comprises a pin actuator including a pin, the pin actuator adapted to move the pin between a locked position and an unlocked position, the pin extended through the pylon lock fitting and the spar lock fitting in the locked position, the pin at least partially retracted from the pylon lock fitting and the spar lock fitting in the unlocked position to permit rotation of the wing extension about the hinge assembly.

11. The propulsion and lift system as recited in claim 4 wherein the hinge assembly further comprises a rotary actuator operable to rotate the wing extension between the flight position and the stow position.

12. The propulsion and lift system as recited in claim 11 wherein the rotary actuator further comprises a lockable rotary actuator operable to selectively lock the wing extension in the stow position.

13. The propulsion and lift system as recited in claim 11 wherein the hinge assembly further comprises a shaft coupling the rotary actuator to the revolute joint, the rotary actuator operable to rotate the shaft to provide rotational energy to the revolute joint, thereby rotating the wing extension.

14. The propulsion and lift system as recited in claim 4 wherein the hinge assembly forms a hinge line offset from the wing extension.

15. The propulsion and lift system as recited in claim 14 wherein the hinge line is vertically offset from the wing extension.

16. The propulsion and lift system as recited in claim 1 further comprising a wing extension lock assembly operable to selectively lock the wing extension into the flight position, the wing extension lock assembly including a pin actuator movable between a locked position and an unlocked position, the pin actuator operable to pin the wing extension against the pylon assembly in the locked position to secure the wing extension in the flight position.

17. A tiltrotor aircraft comprising:
a fuselage;
a wing supported by the fuselage and having first and second outboard ends;
first and second pylon assemblies each rotatably coupled to a respective one of the first and second outboard ends of the wing, the first and second pylon assemblies each having an outboard end; and
first and second wing extensions each rotatably coupled to the outboard end of a respective one of the first and second pylon assemblies, the wing extensions rotatable between a flight position in a flight mode and a stow position in a storage mode;
wherein, the wing extensions fold inboard toward the fuselage in the stow position, thereby reducing a wingspan of the tiltrotor aircraft in the storage mode; and
wherein, the wing extensions each have an angular range of motion of at least 180 degrees such that the wing extensions are parallel with the wing when the wing extensions are in the stow position.

18. The tiltrotor aircraft as recited in claim 17 wherein the pylon assemblies each further comprise a proprotor assembly.

19. The tiltrotor aircraft as recited in claim 17 wherein the wing and the wing extensions form a plane when the wing extensions are in the flight position.

* * * * *